(12) United States Patent
Tokuda et al.

(10) Patent No.: US 8,496,724 B2
(45) Date of Patent: Jul. 30, 2013

(54) PLUGGED HONEYCOMB STRUCTURE AND METHOD FOR MANUFACTURING THE SAME

(75) Inventors: Shingo Tokuda, Nagoya (JP); Yoshimasa Kondo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 165 days.

(21) Appl. No.: 13/070,610

(22) Filed: Mar. 24, 2011

(65) Prior Publication Data

US 2011/0239601 A1 Oct. 6, 2011

(30) Foreign Application Priority Data

Mar. 30, 2010 (JP) ................. 2010-076908

(51) Int. Cl.
- B01D 39/06 (2006.01)
- B01D 39/14 (2006.01)
- B01D 24/00 (2006.01)
- B01D 50/00 (2006.01)

(52) U.S. Cl.
USPC ........... 55/523; 55/524; 55/522; 422/169; 422/170; 422/171; 422/172; 422/179; 422/180; 422/181; 422/182; 422/177; 422/178

(58) Field of Classification Search
USPC ........... 55/522–523; 422/169–172, 177–182
See application file for complete search history.

(56) References Cited

U.S. PATENT DOCUMENTS

| | | | |
|---|---|---|---|
| 5,114,581 A | 5/1992 | Goldsmith et al. | |
| 5,221,484 A | 6/1993 | Goldsmith et al. | |
| 6,753,294 B1 * | 6/2004 | Brisley et al. | 502/439 |
| 7,329,300 B2 * | 2/2008 | Ichikawa | 55/523 |
| 7,393,509 B2 * | 7/2008 | Yamaguchi | 422/177 |
| 8,080,208 B2 * | 12/2011 | Kim | 422/177 |
| 2003/0093982 A1 | 5/2003 | Suwabe et al. | |
| 2004/0172929 A1 * | 9/2004 | Itoh et al. | 55/523 |
| 2004/0206062 A1 * | 10/2004 | Ichikawa | 55/523 |
| 2006/0029769 A1 | 2/2006 | Ichikawa et al. | |

FOREIGN PATENT DOCUMENTS

| | | |
|---|---|---|
| EP | 1 570 893 | 9/2005 |
| EP | 1 733 779 | 12/2006 |
| JP | 62-139915 | 6/1987 |
| JP | 10-249124 | 9/1998 |
| JP | 2003-176709 | 6/2003 |
| JP | 2004-344722 | 12/2004 |
| JP | 2005-248726 | 9/2005 |
| JP | 2006-255539 | 9/2006 |
| JP | 2607898 | 11/2006 |
| JP | 2008-188511 | 8/2008 |

* cited by examiner

Primary Examiner — Amber Orlando
(74) Attorney, Agent, or Firm — Burr & Brown

(57) ABSTRACT

A plugged honeycomb structure including particulate matter (PM) trapping layers disposed on the surfaces of the partition walls extending up to inflow side end faces of the plugging portions that plug outflow cells so that adjacent PM-trapping layers with the partition walls and the plugging portion therebetween are disposed so as to continue on the inflow side end faces of the plugging portions. The PM-trapping layers are extended up to the inflow side end faces of the plugging portions to form protruding portions having a protrusion height corresponding with 0.1 to 2 times the length of a side of the outflow cells from the inflow side end faces of the plugging portions toward the outside of the cell extension direction.

16 Claims, 8 Drawing Sheets

PLUGGED HONEYCOMB STRUCTURE AND METHOD FOR MANUFACTURING THE SAME

BACKGROUND OF THE INVENTION

The present invention relates to a plugged honeycomb structure and a manufacturing method therefor. More specifically, the present invention relates to a plugged honeycomb structure used as a filter for trapping or purifying particulate matter contained in exhaust gas discharged from internal combustion engines such as a diesel engine or from various combustion apparatuses and to a manufacturing method therefor.

Exhaust gas discharged from internal combustion engines such as a diesel engine or from various combustion apparatuses (hereinbelow referred to as "internal combustion engines or the like") contains a large amount of particulate matter (hereinbelow arbitrarily referred to as "particulate matter", "particulates" or "PM") mainly containing soot (graphite). Since air pollution is caused when the particulate matter is released as it stands into the air, it is general that a filter for trapping particulate matter (e.g., diesel particulate filter: hereinbelow sometimes referred to as a "DPF") is mounted in the exhaust gas flow passage from an internal combustion engine or the like.

An example of the filter used for such a purpose is a plugged honeycomb structure (hereinbelow sometimes referred to as a "honeycomb filter") having a substrate of a honeycomb structure having a plurality of cells functioning as exhaust gas flow passages and separated and formed by porous ceramic partition walls having a large number of pores and alternately plugged with plugging portions in one side opening end portions and the other side opening end portions of the cells (see, e.g., JP-A-2006-255539, JP-A-2005-248726, and JP-A-2008-188511).

For example, the plugged honeycomb structure (honeycomb filter 110) shown in FIG. 11 is provided with a honeycomb structure 100 (honeycomb substrate) where a plurality of cells 101 are separated and formed by the porous ceramic partition walls 105 having a large number of pores, and the one side opening end portions X and the other side end portions Y of the cells 101 are alternately plugged with plugging portions 107. Such a honeycomb filter 110 is constituted in such a manner that, when gas $G_1$ flows in from the cells 101a (hereinbelow sometimes referred to as "inflow cells") open in the one side opening end portions X, the gas passes through the partition walls 105 from the surfaces of the partition walls 105 separating and forming the cells 101a, and the gas $G_2$ is discharged from the cells 101b open in the other side end portions Y. That is, the gas $G_1$ flowing into the cells 101a flows out to the cells 101b via the pores formed in the partition walls 105 and discharged from the other side end portion Y of the honeycomb filter 110. In addition, as described above, when the exhaust gas (gas $G_1$) passes through the partition walls, particulate matter in the exhaust gas is trapped by the partition walls, and the gas is purified.

However, since the DPF has such a structure as described above, if the trapping of PM is started in a clean state, PM deposits in the pores inside the partition walls (deep bed filtration) to sometimes increase pressure drop rapidly. Such rapid increase in pressure drop could be a factor of deterioration in engine performance. In order to solve this problem and improve PM trapping efficiency, there is disclosed a DPF where a trapping layers are formed on the inflow side surfaces of the partition walls to inhibit PM from entering the inside of the partition walls (see, e.g., JP-Y-2607898).

In addition, as a method for manufacturing such a honeycomb filter, for example, there is proposed a method where microparticles of a ceramic material to constitute the aforementioned filter layer is sent into one side face of a ceramic porous support by means of a gas current to allow the microparticles to adhere to the one side face of the porous support, and moisture is imparted to the adhering microparticles to allow the microparticles to be absorbed on the one side face of the porous substrate (see, e.g., JP-A-10-249124).

In addition, there has conventionally arisen a problem of gradually clogging the opening portions of the inflow cells by particulate matter in exhaust gas which deposits on the inflow side end face of plugging portions and is enlarged by aggregation of the particles to develop up to the opening portions of the inflow cells. Therefore, there has been proposed also, for example, a plugged honeycomb structure constituted in such a manner that the plugging members have protruding portions protruding outside from the opening end faces of the cells (see, e.g., JP-A-2004-344722 and JP-A-2003-176709).

However, in a plugged honeycomb structure as shown in JP-Y-2607898, exhaust gas blows against the plugging portion end face to cause disorder of the gas flow in the vicinity of the inflow side opening portions. This inhibits soot from entering the inside of the cells and causes deposition in the inflow side opening portions. This reduces the inlet opening diameter to cause a problem of deterioration in pressure drop properties.

In addition, in a plugged honeycomb structure as shown in JP-A-2004-344722 and JP-A-2003-176709, the inflow side end face of the plugging portions are intentionally protruded upon forming plugging portions, or protruding portions are disposed separately on the inflow side end faces of the plugging portions. However, there are problems that the process for manufacturing the protruding portions are very complex, that the shape of the protruding portions obtained is not uniform because the plugging material used is in a slurried form, and that sufficient effect cannot be obtained even when the aforementioned protruding portions are provided because it is very difficult to form the shape as intended since the protruding portions are very minute.

In addition, since the protruding portions formed later of the plugging portions are connected only to the end faces of the plugging portions, the connection strength of the protruding portions disposed on the end faces of the plugging portions is very weak, and there sometimes arises a problem of detachment of the protruding portion from the end face of the plugging portion or breakage of the protruding portion due to wind pressure of exhaust gas, vibrations transmitted to the honeycomb structure, or thermal shock.

SUMMARY OF THE INVENTION

The present invention has been made in view of the prior art problems described above and aims to provide a plugged honeycomb structure capable of successfully trapping particulate matter in exhaust gas and efficiently inhibiting cell opening portions from being clogged due to the deposition of the particulate matter on the inflow side end faces of the plugging portions plugging opening portions of the cells, and a method for manufacturing the plugged honeycomb structure.

As a result of the present inventors' earnest study in order to solve the aforementioned prior art problems, they hit upon the idea for solving the aforementioned problems by disposing a porous trapping layer having pores having an average pore size smaller than that of the partition walls on surfaces of the partition walls on the side where the opening end portions are open on the inflow side and extending the trapping layer up to inflow side end faces of the plugging portions to form protruding portions unitarily continuing from the trapping layer and having a predetermined size (height), which led to the completion of the present invention. Specifically, according to the present invention, there is provided the following plugged honeycomb structure and the manufacturing method therefor.

According to a first aspect of the present invention, a plugged honeycomb structure is provided, the plugged honeycomb structure comprising: a columnar honeycomb substrate having porous partition walls separating and forming a plurality of cells extending over from one side end face to the other side end face and functioning as gas passages, plugging portions for alternately plugging opening end portions on a gas inflow side and opening end portions on a gas outflow side of the cells, and porous PM-trapping layers being disposed to have a membrane shape on surfaces of the partition walls on the side where the opening end portions are open on the inflow side and where inflow cells are separated and formed and having pores having an average pore size smaller than that of the partition walls; wherein the PM-trapping layers are extended up to inflow side end faces of the plugging portions plugging outflow cells plugged in the opening end portions on the gas inflow side so that adjacent PM-trapping layers with the partition walls and the plugging portion therebetween are disposed so as to continue on the inflow side end faces of the plugging portions and that the PM-trapping layers extended up to the inflow side end faces of the plugging portions form protruding portions having a protrusion height corresponding with 0.1 to 2 times the length L of a side of the outflow cells from the inflow side end faces of the plugging portions toward the outside of the cell extension direction.

According to a second aspect of the present invention, the plugged honeycomb structure according to the first aspect is provided, wherein the protruding portions formed continuously from the PM-trapping layers have a protrusion height of 0.05 to 5 mm.

According to a third aspect of the present invention, the plugged honeycomb structure according to the first or second aspect is provided, wherein the protruding portions continuously formed from the PM-trapping layers have a pyramidal shape, a frustum shape, or a shape where each of the sides extending to the top from the bottom face of the pyramidal or frustum shape with the inflow side end faces of the plugging portions as the bottom faces is incurved.

According to a fourth aspect of the present invention, the plugged honeycomb structure according to any one of the first through third aspects is provided, wherein the PM-trapping layers have a thickness of 1 to 100 μm.

According to a fifth aspect of the present invention, a method for manufacturing a plugged honeycomb structure is provided comprising: a step of forming plugging portion by alternately plugging the opening end portions of the cell on the one side end face and the other side end face of a honeycomb substrate having porous partition walls having a large number of pores and forming a plurality of cells functioning as gas passages, and a step of forming a deposition layer where the ceramic particles are deposited by sending ceramic particles by means of a gas current from the one side end face side of the honeycomb substrate where the plugging portions are formed to allow the ceramic particles to enter the honeycomb substrate from the opening portions of the cells where no plugging portion is disposed and allowing the ceramic particles to adhere to the surfaces of the partition walls constituting the honeycomb substrate; wherein, in the step for forming a deposition layer where the ceramic particles are deposited, the ceramic particles are deposited also on the surfaces of the plugging portions in one side end faces of the honeycomb substrate so that the deposition layers continues to form protruding portions having a protrusion height corresponding with 0.1 to 2 times the length L of a side of the cells from the end faces of the plugging portions toward the outside of the cell extension direction by the ceramic particles deposited on the surfaces of the plugging portions.

According to a sixth aspect of the present invention, the method for manufacturing a plugged honeycomb structure according to the fifth aspect is provided, wherein, in the step for forming a deposition layer where the ceramic particles are deposited, suction is performed from the opening portion of the cells having no plugging portion disposed therein on the other side end face side of the honeycomb substrate where the plugging portions are formed to allow the ceramic particles flowing into the substrate from the one side end face side to adhere to the surfaces of the partition walls.

According to a seventh aspect of the present invention, the method for manufacturing a plugged honeycomb structure according to the fifth or sixth aspect is provided, where particles having an average particle diameter of 0.5 to 15 μm are used as the ceramic particles.

According to an eighth aspect of the present invention, the method for manufacturing a plugged honeycomb structure according to any one of the fifth through seventh aspects is provided, wherein the flow rate of the gas for sending the ceramic particles in the step for forming a deposition layer where the ceramic particles are deposited is 50 to 800 L/min.

A plugged honeycomb structure of the present invention can successfully trap particulate matter in exhaust gas and efficiently inhibit pressure drop from rising excessively and cell opening portions from clogging due to deposition of particulate matter on the inflow side end faces of the plugging portions plugging opening portions of the cells.

That is, since porous PM-trapping layers having pores having an average pore size smaller than that of the partition walls are disposed on the surfaces of the partition walls constituting the honeycomb substrate, particulate matter in exhaust gas can effectively be inhibited from entering the pores of the partition walls. Further, since the PM-trapping layers are extended up to the inflow side end faces of the plugging portions and form protruding portions continuing from the PM-trapping layer and having a predetermined size (height), particulate matter hardly deposits on the inflow side end faces of the plugging portions, and opening portions of the inflow cells can effectively be inhibit from clogging due to deposition of particulate matter.

Further, since the protruding portions are formed unitarily with the PM trapping layers (i.e., continuously from the PM trapping layers), the protruding portions hardly peel off from the plugging portions, and, since the protruding portions are porous and have pores having average pore size smaller than that of the partition walls, the protruding portions have high mechanical strength and are hardly damaged due to vibrations, thermal shock, or the like.

In addition, in a method for manufacturing a plugged honeycomb structure of the present invention, upon forming the PM-trapping layer by sending the ceramic particles from the one side end face side of the honeycomb substrate by means of a gas flow, the aforementioned protruding portions are formed with the ceramic particles. The method can fort the protruding portions continuous from the PM-trapping layer very easily. In addition, since the ceramic particles are sent by means of the gas flow, it is possible to impart to the protruding portions a shape hardly hindering the gas flow, i.e., a shape where pressure drop is hardly caused when the gas hits the protruding portions. In addition, it is also possible to plan to uniformalize the shape of the protruding portions to be formed.

Figure 1:
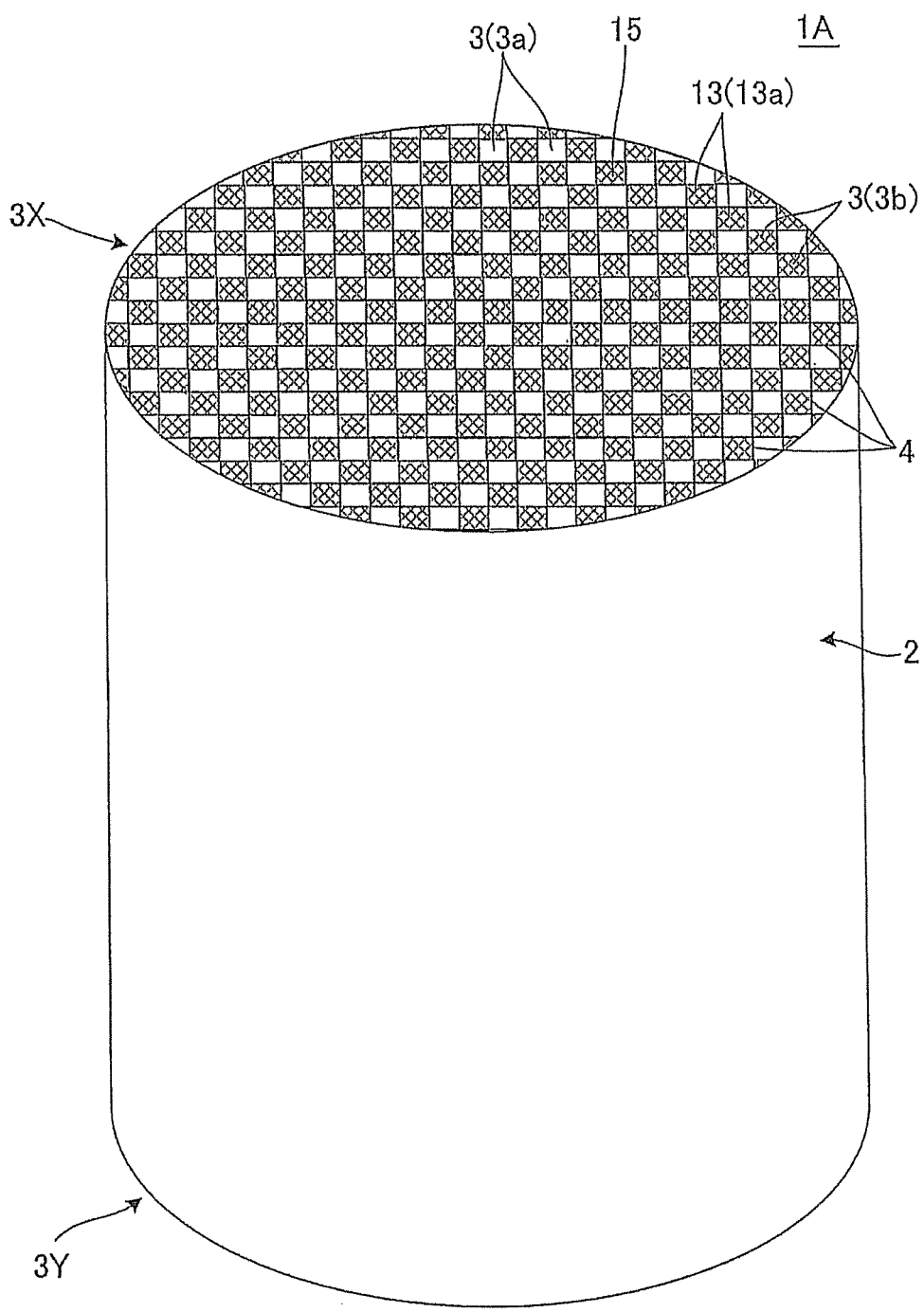
FIG. 1 is a perspective view schematically showing an embodiment of a plugged honeycomb structure of the present invention.

REFERENCE NUMERALS 1, 1A, 1B, 1C: plugged honeycomb structure, 2, 2A: honeycomb substrate, 3: cell, 3a: inflow cell, 3b: outflow cell, 3X: inflow side opening end portion (gas inflow side opening end portion), 3Y: outflow side opening end portion (gas outflow side end portion), 4: partition walls, 5: pore, 13: plugging portion, 13a: plugging portion (plugging portion plugging opening end portion of outflow cell), 13b: plugging portion (plugging portion plugging opening end portions of inflow cell), 14: PM-trapping layer, 15: protruding portion, 20: treatment apparatus, 21: outer periphery cover, 22a: first chuck, 22b: second chuck, 23: discharge flow passage, 24: ceramic particle supply apparatus, 30: PM (particulate matter) 32: particle injector, 51: honeycomb substrate, 52: ceramic particle, 62: honeycomb segment, 63: honeycomb segment bonded article, 64: bonding material 66, outer periphery coat layer, 100: honeycomb structure, 101a, 101b: cell, 105: partition wall, 107: plugging portion, 110: (conventional) honeycomb filter, 204: partition wall, 205: pore, 210: PM (particulate matter), A: air, B: ceramic microparticles, $G_1$: (untreated) exhaust gas, $G_2$: (treated) exhaust gas, X: one side opening end portion, Y: the other side opening end portion

DETAILED DESCRIPTION OF THE INVENTION

Hereinbelow, embodiments for carrying out a plugged honeycomb structure of the present invention and a method for manufacturing the plugged honeycomb structure will specifically be described. However, the present invention widely includes plugged honeycomb structures provided with the matters specifying the invention and the methods for manufacturing the structures and is not limited to the following embodiments.

Figure 2:
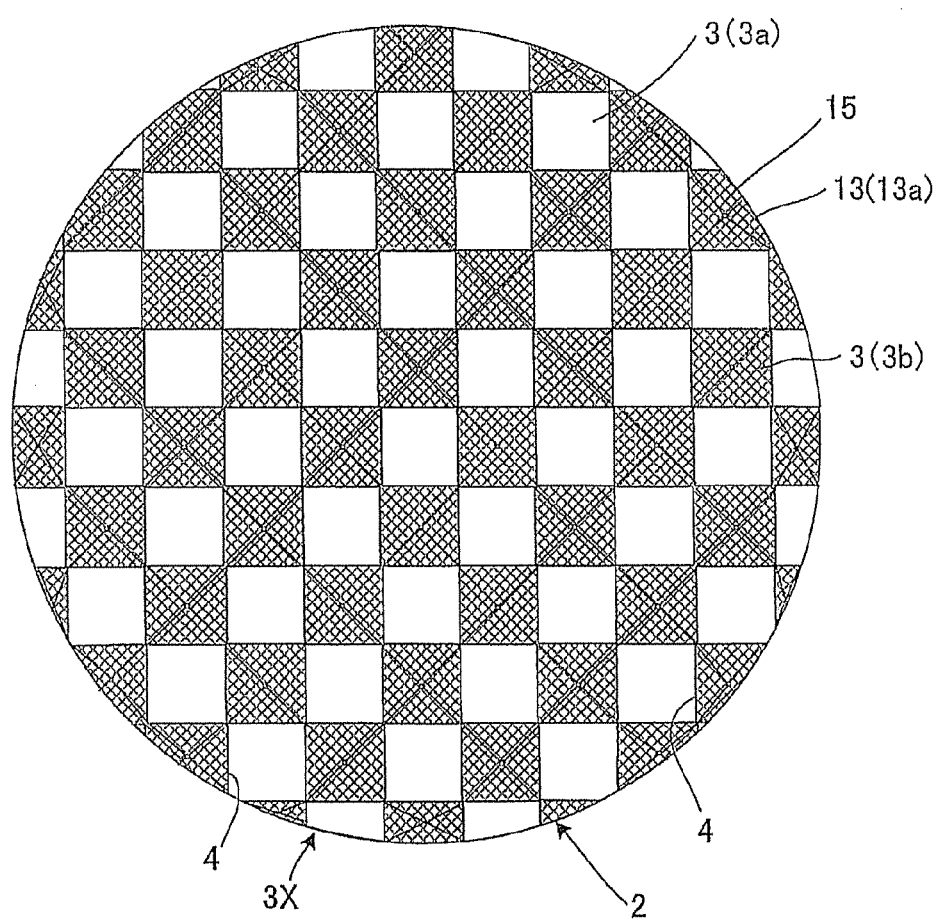
FIG. 2 is a plan view schematically showing one side end face of the plugged honeycomb structure shown in FIG. 1.
Figure 3:
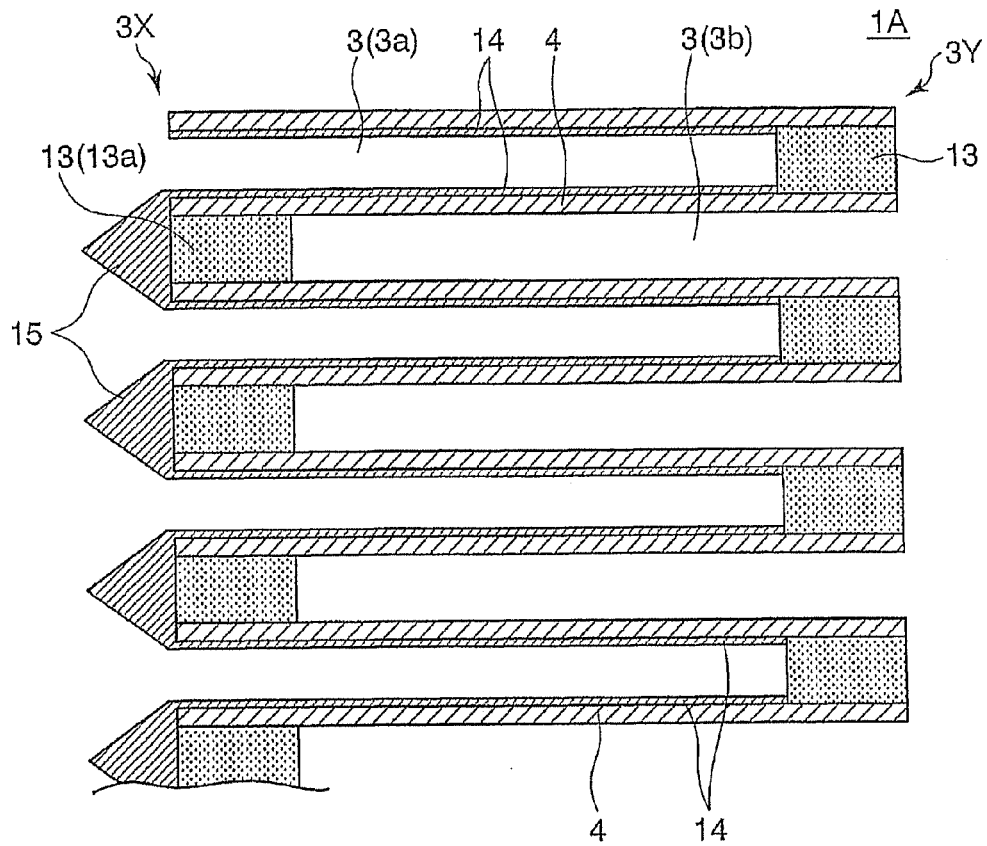
FIG. 3 is a schematic cross-sectional view showing a cross section including the cell extension direction of the plugged honeycomb structure shown in FIG. 1.
Figure 4:
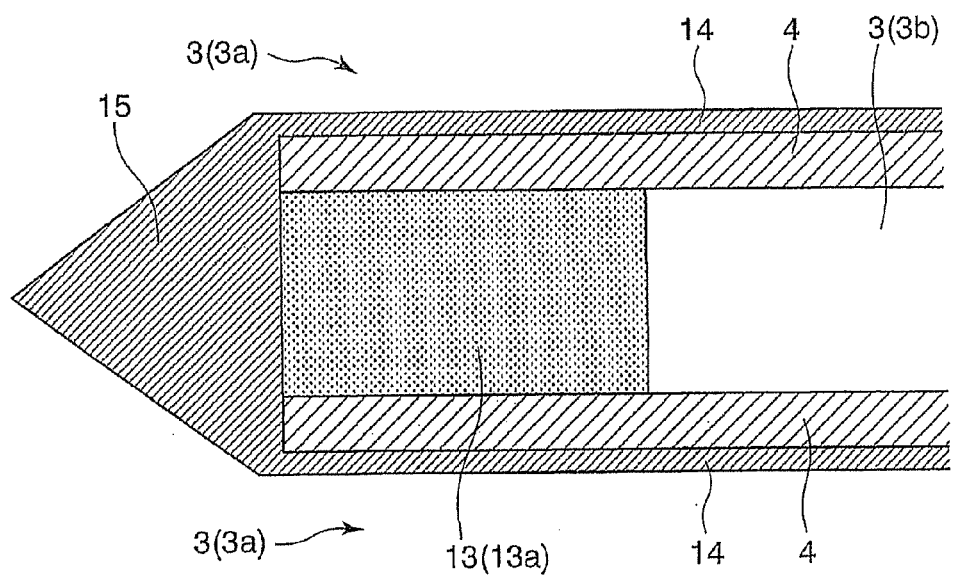
FIG. 4 is an enlarged cross-sectional view showing a gas inflow side portion of the plugged honeycomb structure shown in FIG. 3.

[1] Plugged honeycomb structure of the present invention:

Here, FIG. 1 is a perspective view schematically showing an embodiment of a plugged honeycomb structure of the present invention. FIG. 2 is a plan view schematically showing one side end face of the plugged honeycomb structure shown in FIG. 1. FIG. 3 is a schematic cross-sectional view showing a cross section including the cell extension direction of the plugged honeycomb structure shown in FIG. 1. FIG. 4 is an enlarged cross-sectional view showing a gas inflow side portion of the plugged honeycomb structure shown in FIG. 3.

As shown in FIGS. 1 to 5, the plugged honeycomb structure 1A of the present embodiment is a plugged honeycomb structure 1A provided with a columnar honeycomb substrate 2 having porous partition walls 4 separating and forming a plurality of cells extending over from one side end face to the other side end face and functioning as gas passages, plugging portions 13 for alternately plugging opening end portions 3X on a gas inflow side and opening end portions 3Y on a gas outflow side of the cells 3, and porous PM-trapping layers 14 being disposed to have a membrane shape on surfaces of the partition walls 4 on the side where the opening end portions 3X on the inflow side are open and where inflow cells 3a are separated and formed and having pores having an average pore size smaller than that of the partition walls 4.

In addition, the PM-trapping layers 14 of the plugged honeycomb structure 1A of the present embodiment are extended up to inflow side end faces of the plugging portions 13a plugging outflow cells 3b plugged in the opening end portions 3X on the gas inflow side so that adjacent PM-trapping layers 14 with the partition walls 4 and the plugging portion 13a (i.e., outflow cell 3b) therebetween are disposed so as to continue on the inflow side end faces of the plugging portions 13a and that the PM-trapping layers 14 extended up to the inflow side end faces of the plugging portions 13a form protruding portions 15 having a protrusion height corresponding with 0.1 to 2 times the length L of a side of the outflow cells 3b from the inflow side end faces of the plugging portions 13a toward the outside of the cell 3 extension direction.

The plugged honeycomb structure of the present embodiment constituted as described above can successfully trap particulate matter in exhaust gas and efficiently inhibit pressure drop from rising excessively and inflow cell opening portions from clogging due to deposition of the particulate matter on the inflow side end faces of the plugging portions plugging the opening portions of the outflow cells.

That is, since porous PM-trapping layers having pores having an average pore size smaller than that of the partition walls are disposed on the surfaces of the partition walls constituting the honeycomb substrate, particulate matter in exhaust gas can effectively be inhibited from entering the pores of the partition walls. Further, since the PM-trapping layers are extended up to the inflow side end faces of the plugging portions to form protruding portions continuous from the PM-trapping layers and having a predetermined size (height), particulate matter hardly deposit on the inflow side end faces of the plugging portions, and the inflow cell opening portions can effectively be inhibited from clogging due to deposition of particulate matter.

Further, since the protruding portions are formed unitarily with the PM-trapping layers (i.e., continuously from the PM-trapping layers), the protruding portions hardly peel off from the plugging portions.

Figure 5:
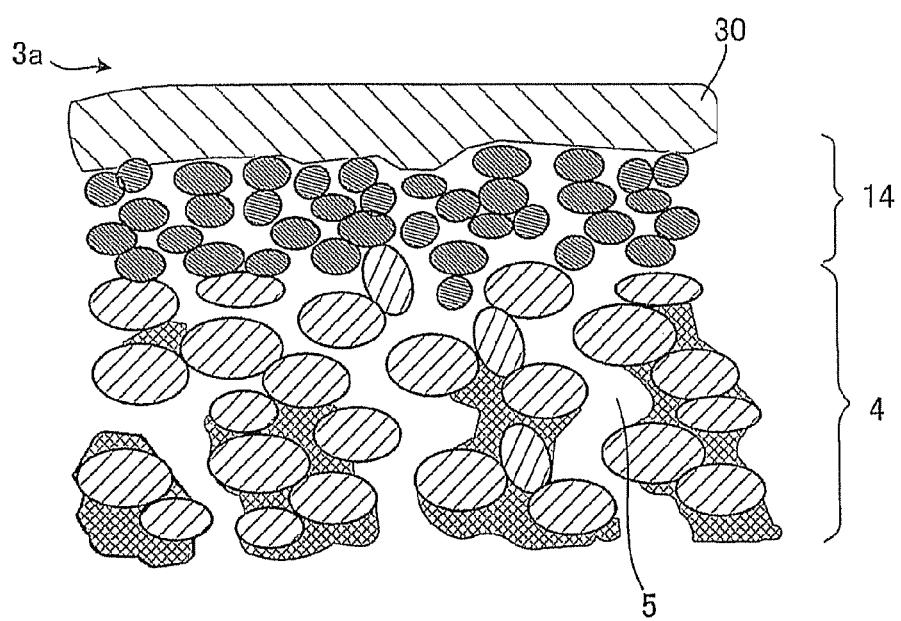
FIG. 5 is an explanatory view schematically showing a state where particulate matter (PM) is trapped in a plugged honeycomb structure of the present invention.

Here, the effect of disposing the PM-trapping layers on the surfaces of the partition walls will more specifically be described with referring to FIG. 5.

In the plugged honeycomb structure of the present embodiment, as shown in FIG. 5, the PM-trapping layers 14 are formed on the inflow cell side surfaces (i.e., surfaces on the side where the inflow cells 3a are separated and formed) of the partition walls 4 on the side where the inflow cells 3a are separated and formed to be able to inhibit particulate matter (PM 30) from entering the inside of the pores 5 of the partition walls 4 and to be able to obtain an effect of inhibiting the pressure drop from rising after PM deposition. That is, since the average pore size of the PM trapping layers 14 is smaller than that of the partition walls 4, almost all the PM contained in exhaust gas deposits in a cake layer shape on the PM trapping layers 14, and the particulate matter can remarkably be inhibited from entering the inside of the pores 5 of the partition walls 4.

Here, FIG. 5 is an explanatory view schematically showing a state where particulate matter (PM) is trapped in a plugged honeycomb structure of the present invention and showing a cross section of a partition wall.

Figure 6:
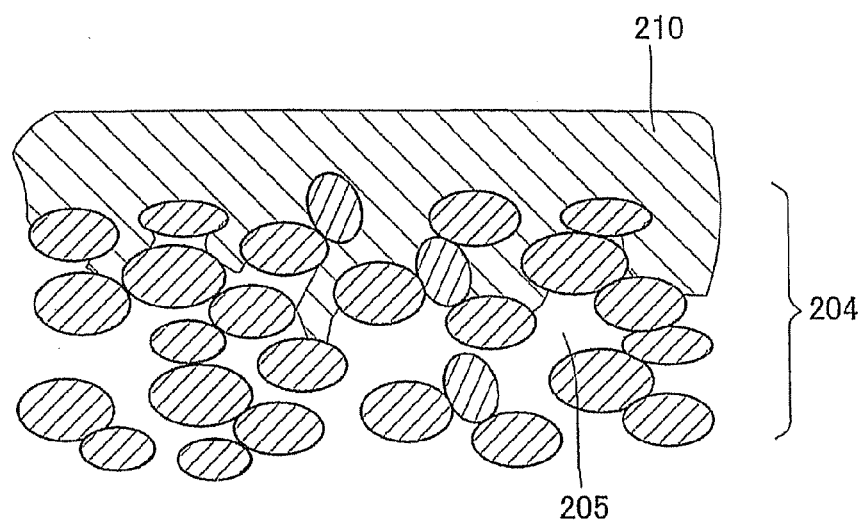
FIG. 6 is an explanatory view schematically showing a state where particulate matter (PM) is trapped in a partition wall of a conventional plugged honeycomb structure.

Incidentally, for example, in the case that the aforementioned PM-trapping layers are not formed on the partition walls, as shown in FIG. 6, particulate matter (PM210) enters the pores 205, whose average pore size is large in comparison with that of the PM-trapping layers, of the partition walls 204. Since the pores formed in the partition walls function as flow passages when exhaust gas passes through the partition walls, if the partition wall is clogged with soot (graphite), ash, or the like as particulate matter, pressure drop of the plugged honeycomb structure rapidly increases. Therefore, in a plugged honeycomb structure with no PM-trapping layer formed therein, in an early stage of trapping PM, pressure drop rises by the clogging of pores in partition walls with PM in addition to the rise in pressure drop due to PM deposition on the partition walls, thereby excessively increasing pressure drop of the filter (hereinbelow, such rise in pressure drop is sometimes referred to as "initial pressure drop rise"). In particular, since pressure drop rise due to clogging of pores in partition walls with PM is large in comparison with pressure drop rise due to deposition of PM on the partition walls, pressure drop rise due to clogging of pores of partition walls with PM influences the pressure drop rise of the plugged honeycomb structure to a large extent. Here, FIG. 6 is an explanatory view (cross-sectional view of a partition wall) schematically showing a state where particulate matter (PM) is trapped in a conventional plugged honeycomb structure.

Since porous PM-trapping layers having pores having average pore size smaller than that of the partition walls are disposed on the surfaces separating and forming the inflow cells of the porous partition walls having a large number of pores, the plugged honeycomb structure of the present embodiment can inhibit PM from entering the inside of the pores of the partition walls by the PM-trapping layers and can obtain the effect in inhibiting pressure from rising after PM deposition.

In addition, in the case of employing a conventional plugged honeycomb structure having no PM-trapping layer as a honeycomb filter (e.g., diesel particulate filter (hereinbelow sometimes referred to as "DPF")), soot (i.e., PM) is easily trapped in the partition walls of the plugged honeycomb structure, pressure drop rise from the early stage of PM deposition becomes remarkably high, and, since PM brought into contact with the catalyst for accelerating combustion of PM carried on the surfaces of the partition walls or inside the pores of the partition walls burns early in comparison with PM which is not brought into contact with the catalyst upon natural regeneration by the catalyst during driving, there arises a phenomenon of having a low pressure drop value with respect to the PM deposition amount in comparison with a pressure drop value with respect to the PM deposition amount in the case of no regeneration (hereinbelow, such a phenomenon is sometimes referred to as "pressure drop hysteresis"). When the difference (pressure drop hysteresis) is large, since assumption of the PM deposition amount due to pressure drop is difficult, there is a problem of deterioration in controllability upon regeneration of honeycomb filter (hereinbelow sometimes referred to as "regeneration controllability"). Since the plugged honeycomb structures of the present embodiment not only inhibits PM from depositing in the partition walls, but also can avoid pressure drop hysteresis, reduce pressure drop, and raise pressure drop at a relatively constant rate from the initial stage of PM trapping; the trapping amount of depositing PM can be assumed by the raised pressure drop with high accuracy.

Further, in the plugged honeycomb structure of the present embodiment, the PM-trapping layers are extended up to the inflow side end faces of the plugging portions plugging the outflow cells plugged in the opening end portions on the gas inflow side so that adjacent PM-trapping layers with the partition walls and the plugging portion therebetween are disposed so as to continue on the inflow side end faces of the plugging portions and that the PM-trapping layers form protruding portions from the inflow side end faces of the plugging portions toward the outside of the cell extension direction. Therefore, the gas flow becomes smooth, particulate matter easily enters deep portions of the cells (i.e., reaches the outflow side end face), and clogging of the opening end portions on the gas inflow side can efficiently be inhibited.

For example, when the inflow side end faces of the plugging portions are flat, since gas hits the end faces of the plugging portions to raise back pressure, and particulate matter is trapped and concentrated in the vicinity of the opening end portions on the inflow side, the opening end portions on the inflow side are clogged with particulate matter in a very short period of time. Therefore, even in the plugged honeycomb structure provided with PM-trapping layers, the opening end portions on the inflow side are clogged with particulate matter before the PM-trapping layers successfully function, and sometimes the aforementioned effect by the PM-trapping layers is not sufficiently exhibited.

Hereinbelow, each constituent of the plugged honeycomb structure of the present embodiment will specifically be described.

[1-1] Honeycomb Substrate and Plugging Portions:

The honeycomb substrate constituting the plugged honeycomb structure of the present embodiment has porous partition walls 4 having a large number of pores as shown in FIGS. 1 to 4, and a plurality of cells 3 functioning as gas passages are separated and formed by the partition walls 4. In the honeycomb substrate 2, the inflow side opening end portions 3X of the cells 3 and the outflow side opening end portions 3Y are alternately plugged with plugging portions 13, and inflow cells 3a where the inflow side opening end portions 3X are open and the outflow cells 3b where the outflow side opening end portions 3Y are open are alternately disposed with partition walls 4 therebetween.

The entire shape of the honeycomb substrate is columnar shape. There is no particular limitation on the entire shape of the honeycomb substrate, and examples of the shape include, besides a cylindrical shape as shown in FIGS. 1 and 2, an elliptic shape, a quadrangular columnar shape, and triangular columnar shape. For such a honeycomb substrate, there can suitably be employed a honeycomb structure used for a conventionally known plugged honeycomb structure.

In addition, examples of the shape of the cells (cell shape in a cross section perpendicular to the cell formation direction) formed in the honeycomb substrate include, besides a quadrangular cell shape as shown in FIG. 1, shapes of a hexagonal cell, an octagonal cell, and triangular cell. However, the cell shape is by no means limited to these shapes and can widely includes known cell shapes.

In addition, in a honeycomb substrate (i.e., unplugged honeycomb structure) to be used for plugged honeycomb structure of the present embodiment, different cell shapes may be combined. By employing an octagonal shape for one of adjacent cells and employing a quadrangular shape for the other of the adjacent cells, the one cell (i.e., octagonal cell) can be made large in comparison with the other cell (i.e., quadrangular cells). In particular, when it is used for an engine having a high ash generation amount, pressure drop rise upon ash deposition can be inhibited by making the cells on the gas inflow side (inflow cells) large.

There is no particular limitation on the cell density of the honeycomb substrate. However, in the case of employing a plugged honeycomb structure as in the present embodiment, the density is preferably 0.9 to 233 cells/cm$^2$, more preferably 15.5 to 62.0 cells/cm$^2$, particularly preferably 23.3 to 45.0 cells/cm$^2$. To make the density in such a range, the region where particulate matter is retained in the inflow cells can successfully be secured.

The thickness of the partition walls constituting the honeycomb substrate is preferably 20 to 2000 μm, more preferably 100 to 635 μm from the viewpoint of the balance between the strength and the pressure drop, particularly preferably 200 to 500 μm.

Though there is no particular limitation on the material for the honeycomb substrate, ceramic material can suitably be employed. From the viewpoints of strength, thermal resistance, corrosion resistance, and the like, the material is preferably one of cordierite, silicon carbide, alumina, mullite, aluminum titanate, silicon nitride, and silicon-silicon carbide based composite material formed with silicon carbide as the framework and metal silicon as the binder.

Incidentally, there can be used the plugging portions used for the plugged honeycomb structure of the present embodiment and constituted in the same manner as the plugging portions used for a conventional plugged honeycomb structure. Incidentally, in particular, suitable examples include plugging portions formed with the same material as the protruding portions continuous from the PM-trapping layers. By such plugging portions, in the case that the end faces of the plugging portions (end faces on the protruding portion formation side) are depressed, the framework particles (i.e., ceramic microparticles) in the protruding portions enter the depressions of the aforementioned plugging portions to make the bonding of the protruding portions to the plugging portions firmer.

When the average pore size of the partition walls constituting the honeycomb substrate is large, formation of the PM-trapping layers is hard, while, when the average pore size is small, for example, loading of a catalyst is difficult upon loading the catalyst (e.g., oxidation catalyst) for removing particulate matter trapped in the plugged honeycomb structure. Therefore, the average pore size of the partition wall is preferably 0.3 to 150 μm, more preferably 1 to 60 and particularly preferably 3 to 30 μm.

In addition, the partition walls have a porosity of preferably 30 to 70%, more preferably 35 to 60%. When the porosity is below 30%, pressure drop may become large. In addition, when the porosity is above 70%, the partition walls have insufficient strength, which is not preferable. The aforementioned porosity of the partition walls shows the porosity of the original partition walls of the honeycomb substrate excluding the PM-trapping layer. In the present invention, the "average pore size" and the "porosity" of the partition walls mean the "average pore size" and the "porosity" measured by mercury penetration method.

Such partition walls can be obtained by, for example, mixing ceramic framework particles and water and, at request, an organic binder (hydroxypropoxylmethyl cellulose, methyl cellulose, and the like), a pore former (graphite, starch, synthetic resin, and the like), a surfactant (ethylene glycol, fatty acid soap, and the like), and the like; kneading them to obtain kneaded clay; forming the kneaded clay into a desired shape; and drying the formed kneaded clay to obtain a formed article; and firing the formed article. Incidentally, it is preferable that the average particle diameter of the aforementioned framework particles is larger than that of the ceramic particles for forming the PM-trapping layers and the like.

Figure 9:
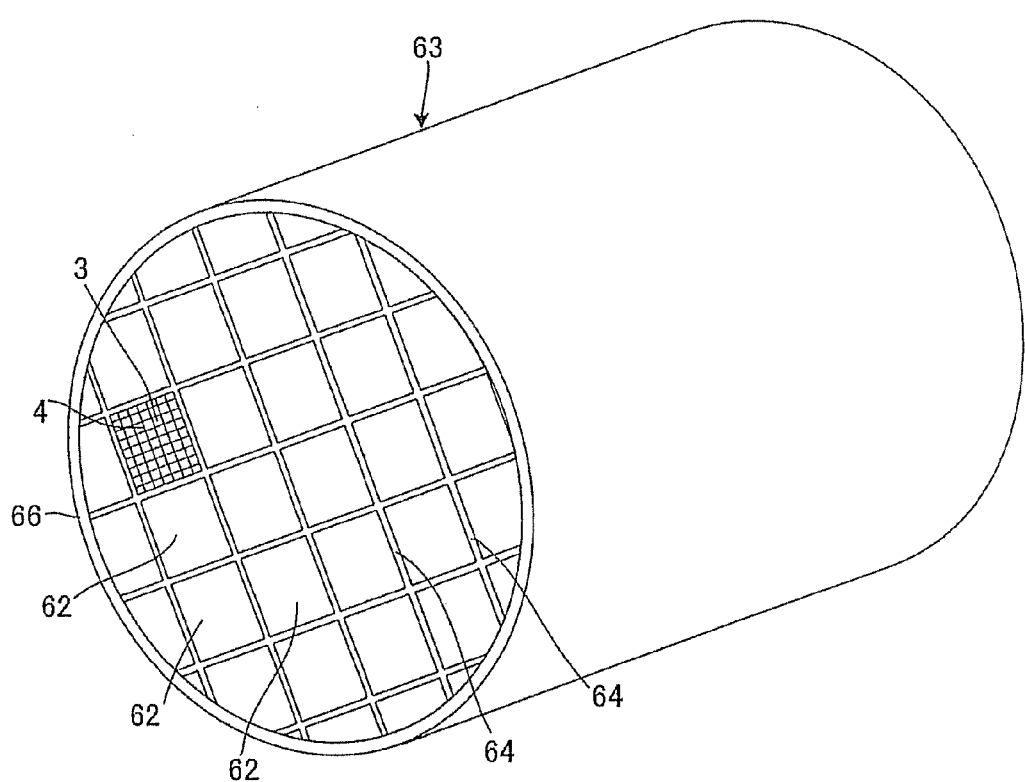
FIG. 9 is a perspective view schematically showing a honeycomb substrate applied to another embodiment of a plugged honeycomb structure of the present invention.

Incidentally, in the honeycomb substrate used for the plugged honeycomb structure of the present embodiment, in the case that, for example, the honeycomb substrate 2A as shown in FIG. 9 is constituted of a honeycomb segment bonded article 63 of a plurality of honeycomb segments 62, that the honeycomb segments 62 are bonded together by a bonding material 64, and that the outer peripheral face is ground to have a desired shape to form the substrate, there is the following manufacturing method as an example. However, the method for manufacturing a honeycomb substrate is by no means limited to the following manufacturing method, and, for example, the method can be performed according to a method for manufacturing a honeycomb substrate (honeycomb structure) used for a known plugged honeycomb structure. Here, FIG. 9 is a perspective view schematically showing a honeycomb substrate applied to another embodiment of a plugged honeycomb structure of the present invention. Incidentally, the reference numeral 66 shown in FIG. 9 shows an outer periphery coat layer.

In the first place, as the raw materials for the honeycomb segment, for example, a SIC powder and a metal Si powder are mixed together at a mass ratio of 80:20; methyl cellulose, hydroxypropxylmethyl cellulose, a surfactant, and water are added to the mixture; and they are kneaded to obtain kneaded clay having plasticity. Next, the kneaded clay is subjected to extrusion forming using a predetermined die to obtain a honeycomb segment formed article having a desired shape. Next, the honeycomb segment formed article is dried by a microwave drier and further completely dried by a hot air drier.

Next, opening portions of predetermined cells are plugged with slurry for forming plugging portions to form plugging portions. Then, a honeycomb segment formed article having plugging portions formed therein is fired (calcined).

The aforementioned calcination is performed for degreasing, and the calcination is performed, for, example, at 550° C. for about three hours in an oxidation atmosphere. However, the calcination is not limited to the above example and is preferably formed in accordance with organic substances (the organic binder, the dispersant, the pore former, and the like) in the honeycomb formed article. Generally, since the combustion temperature of the organic binder is about 100 to 300° C., and the combustion temperature of the pore former is about 200 to 800° C., the calcination temperature may be about 200 to 1000° C. Though there is no particular limitation on the calcination time, it is generally about 3 to 100 hours.

Further, firing (main firing) is performed. The "main firing" means an operation for securing predetermined strength by sintering the forming raw material in the calcined article. Since the firing conditions (temperature and time) depend on the kinds of the forming raw material, appropriate conditions may be selected according to the kind. For example, though the firing temperature in the case of firing in an Ar inert atmosphere is generally about 1400° C. to 1500° C., the temperature is not limited to the range.

A honeycomb substrate can be manufactured as described above. Incidentally, though the aforementioned manufacturing method is an example where a honeycomb substrate is manufactured in such a manner that the calcination and the main firing are performed after plugging portions for plugging opening portions of the cells are formed, the plugging portions may be formed separately after firing of the honeycomb segment formed article is performed. Incidentally, the method for forming plugging portions may be a method where a mask is disposed on the one side opening portions of the predetermined cells to fill the plugging slurry into the opening portions of the remaining cells. Incidentally, such a method for forming plugging portions can be performed according to, for example, a method for manufacturing plugging portions in a known plugged honeycomb structure.

Incidentally, for the plugging portions, it is preferable to employ the same material as the aforementioned honeycomb segment raw material because the expansion rate upon firing can be the same as that of the honeycomb segment to improve durability.

In the aforementioned manufacturing method, there is described an example where the honeycomb substrate is produced of a honeycomb segment bonded article of a plurality of honeycomb segments. However, for example, the honeycomb substrate may be formed by unitary extrusion forming (unitary forming). That is, the honeycomb substrate may be formed by extrusion forming at one time. In the case of unitarily forming a honeycomb substrate in such a manner, there can suitably be employed a method where the kneaded clay prepared as described above is subjected to extrusion forming using a die, having a desired cell shape, partition wall thickness, and cell density; and the like.

In addition, though an example in the case of using a SiC powder and a metal Si powder as the raw materials for the honeycomb segment is described in the aforementioned manufacturing method, for example, in the case of manufacturing the honeycomb substrate by cordierite, the kneaded clay can be prepared by adding a dispersion medium such as water and a pore former to the cordierite forming raw material and further adding an organic binder and a dispersant, followed by kneading them. In the case of firing a formed article obtained by extrusion forming kneaded clay using a cordierite raw material, it is preferable to fire at 1410 to 1440° C. for about 3 to 10 hours.

[1-2] PM-Trapping Layers and Protruding Portions Continuous from the PM-Trapping Layers:

As described above, the plugged honeycomb structure of the present embodiment is provided with porous PM-trapping layers being disposed to have a membrane shape on surfaces of the partition walls on the side where the opening end portions are open on the inflow side and where inflow cells are separated and formed and having pores having an average pore size smaller than that of the partition walls.

Therefore, the PM-trapping layers are extended up to inflow side end faces of the plugging portions plugging outflow cells plugged in the opening end portions on the gas inflow side so that adjacent PM-trapping layers with the partition walls and the plugging portion therebetween are disposed so as to continue on the inflow side end faces of the plugging portions and that the PM-trapping layers extended up to the inflow side end faces of the plugging portions form protruding portions having a protrusion height corresponding with 0.1 to 2 times the length L of a side of the outflow cells (in other words, a side of a plugging portion plugging an outflow cell) from the inflow side end faces of the plugging portions toward the outside of the cell extension direction.

Incidentally, the PM-trapping layers can be formed by a deposition layer where ceramic particles are deposited by, for example, sending ceramic particles by means of a gas current from the one side end face side of the honeycomb substrate where the plugging portions are formed to allow the ceramic particles to enter the honeycomb substrate from the opening portions of the cells where no plugging portion is disposed and to allow the ceramic particles to adhere to the surfaces of the partition walls constituting the honeycomb substrate.

At this time, for example, by adjusting the particle diameter of the ceramic particles, the porous PM-trapping layers having pores having an average pore size smaller than that of the partition wall can be formed.

In the plugged honeycomb structure of the present embodiment, such PM-trapping layers are extended up to the inflow side end faces of the plugging portions to form protruding portions protruding from the inflow side end faces of the plugging portions toward the outside in the cell extension direction and having a predetermined height.

Incidentally, the height of the protruding portion corresponds with 0.1 to 2 times the length L of a side of the outflow cells. For example, when it is below 0.1 times the length L of a side of the outflow cells, the protruding portions are too low, and the gas flow cannot be adjusted. On the other hand, when it is above 2 times, the protruding portions become too high, and the protrusion may be detached upon conveyance under high load.

Incidentally, the height of the protruding portions is preferably 0.1 to 1.5, more preferably 0.5 to 1 times the length L of a side of the outflow cells. This constitution enables to make the gas flow smoother, and the particulate matter deeply enters inside the cells to effectively inhibit opening end portions on the gas inflow side from clogging.

Incidentally, the length L of a side of the outflow cells is the length of the side when the cell shape (cell shape in a cross section perpendicular to the cell formation direction) is square. For example, the length L is a length of a shorter side of the plugging portions to serve as bases of the protruding portions in the case of a rectangular cell shape, and the length L is a length of a longer side of the plugging portions to serve as bases of the protruding portions in the case of a hexagonal cell and the case of an octagonal cell.

In addition, the PM-trapping layers may be multilayered (i.e., laminated layers each has two or more PM-trapping layers). In addition, the pore size or the particle diameter of the PM-trapping layer may be inclined. In such a case, the pore size or the particulate diameter is preferably smaller as it is closer to the surface because PM deposition in the pores of the partition walls can be inhibited and because pressure drop can be reduced.

Incidentally, the "average pore size" and the "porosity" of the PM-trapping layers of the present invention mean the values measured by subjecting images taken by a SEM (scanning electron microscope) to binarization.

In addition, the average pore size of the PM-trapping layers in the plugged honeycomb structure of the present embodiment is preferably 0.1 to 30 μm, more preferably 0.1 to 15 μm, furthermore preferably 0.9 to 11 μm, particularly preferably 1.5 to 6 μm. Such constitution enables to successfully trap (i.e., trap in a layered cake shape) particulate matter on the surfaces of the PM-trapping layers with effectively inhibiting pressure drop from rising due to the PM-trapping layers.

Incidentally, when the average pore size is below 0.1 μm, gas permeability is reduced to rapidly raise permeation resistance of the pores, which is not preferable. When it is above 15 μm, trapping performance is deteriorated, and the PM emission easily exceeds the Euro 5 regulation value of European regulations, which is not preferable.

Incidentally, the average pore size of the PM-trapping layer can be measured by the following method. In the first place, a desired region of a cross section perpendicular to the axial direction of a partition wall of the plugged honeycomb structure is resin filled and subjected to polishing, and an image is obtained by SEM (scanning electron microscope) observation with a 100 to 1000-power vision. Next, the image is subjected to binarization, and diameters of five circles inscribed in the gaps among microparticles are measured. The average value of the obtained diameters is calculated, and the average value is employed as the average pore size of the PM-trapping layer.

In addition, when the average particle diameter of the microparticles forming the PM-trapping layers is measured, the particle diameter of the microparticles forming the PM-trapping layers is measured by observing a cross section or a fracture cross section which is perpendicular to the axial direction of a partition wall and whose desired region has been resin filled and subjected to polishing with a SEM (scanning electron microscope) with a 100 to 1000-power vision. The average of all the particle diameters measured in one vision is determined as the average particle diameter.

In addition, in the case of comparing the average pore size of the PM-trapping layers with that of the partition walls, the average pore size of the PM-trapping layers is preferably $1/1000$ to $9/10$, more preferably $1/100$ to $1/2$, particularly preferably $1/20$ to $1/5$, times the average pore size of the partition walls. When the average pore size of the PM-trapping layer is below $1/1000$ of that of the partition walls, the pores of the PM-trapping layers and the like are too small, and therefore pressure drop of the plugged honeycomb structure may become large. On the other hand, when the average pore size of the PM-trapping layers is above $9/10$ of that of the partition walls, the pores of the PM-trapping layers are too large, and there is no practical difference from the pores of the partition walls, and therefore particulate matter enters the pores of the PM-trapping layers, which may increase pressure drop.

In addition, the thickness of the PM-trapping layers is preferably $3/500$ to $1/2$, more preferably $1/150$ to $1/5$, particularly preferably $1/100$ to $1/10$ of the thickness of the partition walls. Incidentally, when the thickness of the PM trapping layers is below $3/500$ of that of the partition walls, the PM-trapping layers is too thin, and trapping of particulate matter may be sufficient, and therefore a part of particulate matter sometimes passes through the PM-trapping layers easily. In addition, when the thickness of the PM-trapping layers is above $1/2$ of that of the partition walls, influence of rise in pressure drop due to the PM-trapping layers increases, and it sometimes increases the initial pressure drop of the plugged honeycomb structure.

Incidentally, in the present invention, the "thickness of the PM-trapping layers" means the thickness measured by the following method.

(Method for Measuring Thickness of PM-Trapping Layer)

In the first place, a partition wall where a PM-trapping layer is formed is cut perpendicularly to the axial direction of the partition wall. Next, a desired region in the cross-section of the partition wall obtained above is resin filled and subjected to polishing. Next, an image of the cross section resin filled and subjected to polishing is taken by a scanning electron microscope (SEM) at 500-fold magnification. The straight lines horizontally divining the SEM photograph into 100 are drawn and observed starting from the top. The top straight line among the straight lines in touch with a surface of the partition wall and the top straight line among the straight lines in touch with a particle forming the PM-trapping layer are determined independently. The distance between the two straight lines is determined as the membrane thickness of the vision (i.e., in the SEM photograph), and the average value of 20 visions (i.e., in 20 SEM photographs taken in different positions at the same magnification) is determined as the thickness of the PM-trapping layer.

Incidentally, more specifically, the thickness of the PM-trapping layer is preferably 1 to 100 μm, more preferably 5 to 60 μm. This constitution enables to successfully trap particulate matter and to effectively inhibit increase of initial pressure drop.

The ceramic particles constituting the PM-trapping layers are preferably one of, for example, cordierite, silicon carbide, alumina, mullite, aluminum titanate, and silicon nitride.

In addition, these ceramic particles are preferably made of the same material as that of the partition walls constituting the honeycomb substrate. For example, when the partition walls are constituted of a cordierite material, it is preferable that the PM-trapping layers are formed by the use of ceramic particles of the same cordierite material as that of the partition walls. Such constitution makes the thermal expansion the same between the partition walls and the PM-trapping layers to suppress damages and the like due to thermal change upon compulsory regeneration of the plugged honeycomb structure.

In addition, the porosity of the PM-trapping layers is preferably 40 to 90%, more preferably 50 to 80%. When the porosity of the PM-trapping layers is below 40%, there may be caused a problem of increase in pressure drop. When it is above 90%, since strength of the PM-trapping layers is insufficient, the PM-trapping layers may be peeled off from the surfaces of the partition walls, which is not preferable.

In addition, it is preferable to make the porosity of the PM-trapping layers higher than that of the partition walls by 5% or more because there is an advantage of being able to reduce pressure drop (permeation pressure drop) in the PM-trapping layers.

Incidentally, the porosity of the PM-trapping layers can be measured by the comparison of a gap in one vision to the particulate area by subjecting a desired region of a cross-section perpendicular to the axial direction of a partition wall to resin filling and polishing for SEM (scanning electron microscope) observation with a 100 to 1000-power vision and subjecting the image obtained above to binarization.

In addition, to the PM-trapping layers in the plugged honeycomb structure of the present embodiment, not only the role (function) for trapping particulate matter in advance by inhibiting the particulate matter from entering the pores of the partition walls as described above, but also the role (function) for oxidizing PM trapped by the PM-trapping layers may be imparted.

That is, an oxidation catalyst may be loaded on the PM-trapping layers. Such constitution enables to successfully trap PM in the PM-trapping layers formed on the inflow side of the partition walls and to oxidize the trapped PM because the function as the PM-trapping layers for trapping PM is combined with the function for oxidizing PM.

As such an oxidation catalyst, there can suitably be used noble metals such as platinum (Pt), palladium (Pd), rhodium (Rh), and silver (Ag).

Incidentally, in the plugged honeycomb structure of the present embodiment, besides the aforementioned oxidation catalyst, other catalysts or a purification material may further be loaded. For example, an auxiliary catalyst represented by oxides of, for example, cerium (Ce) and zirconium (Zr) may be loaded.

Incidentally, such an oxidation catalyst may further be loaded on at least a part of the inside of pores of the partition walls. Even in the case that a part of the PM in exhaust gas passes through the PM-trapping layers without being trapped by the PM-trapping layers and enters the pores of the partition walls, such constitution enables to combust and remove the PM by the oxidation catalyst.

Incidentally, though there is no particular limitation on the load amount of such an oxidation catalyst, the amount is preferably 1 to 34 g/L, more preferably 5 to 30 g/L. For example, when the load amount of the oxidation catalyst is below 1 g/L, PM combustion performance may be insufficient. On the other hand, when it is above 34 g/L, the pores of the PM-trapping layers may be clogged, and the pressure drop may remarkably rise even in a state of no soot deposition. Since the particulate matter deposits almost in the PM-trapping layers, loading in the inside of the pores of the partition walls is unnecessary. Therefore, the load amount can be reduced in comparison with a conventional amount.

In addition, in the plugged honeycomb structure of the present embodiment, protruding portions having a protrusion height corresponding with 0.1 to 2 times the length L of a side of the outflow cells are formed from the inflow side end faces of the plugging portions toward the outside of the cell extension direction by the PM-trapping layers extended up to the inflow side end faces of the plugging portions.

That is, the protruding portions protruding from the inflow side end faces of the plugging portions toward the outside of the cell extension direction are unitarily formed continuously from the PM-trapping layers by a porous material having pores having an average pore size smaller than that of the partition walls like the PM-trapping layers.

Incidentally, as described above, the protrusion height of the protruding portions corresponds with 0.1 to 2 times the length L of a side of the outflow cells. However, specifically, the height is preferably 0.1 to 5 mm, more preferably 0.5 to 2.5 mm.

Figure 7:
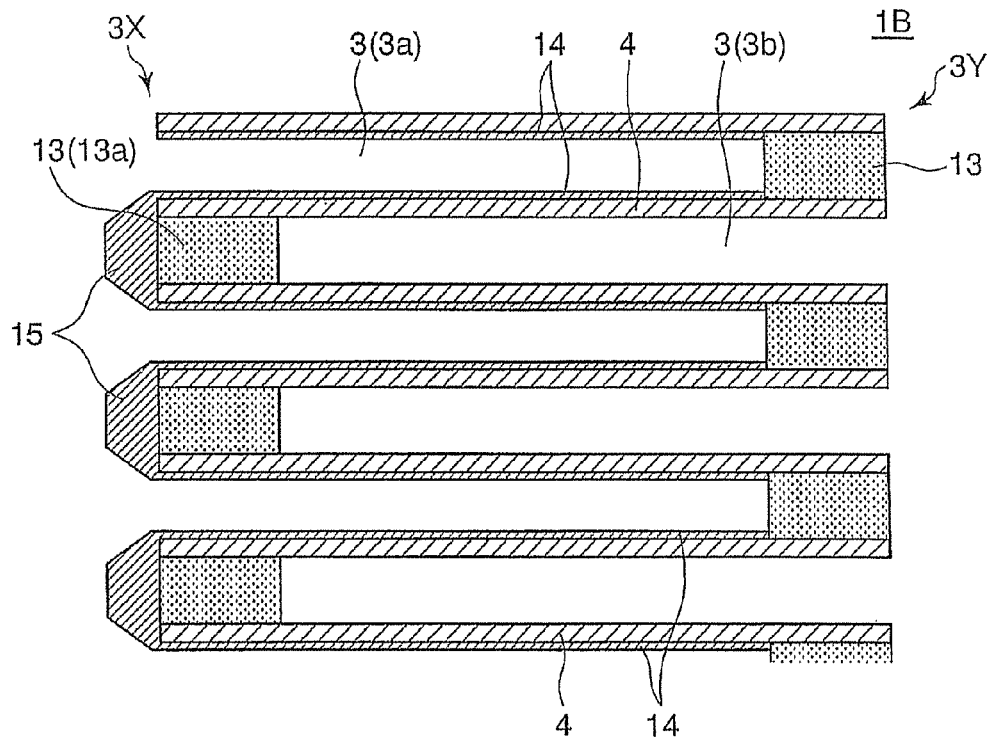
FIG. 7 is a schematic cross-sectional view showing a cross section including the cell extension direction of another embodiment of a plugged honeycomb structure of the present invention.
Figure 8:
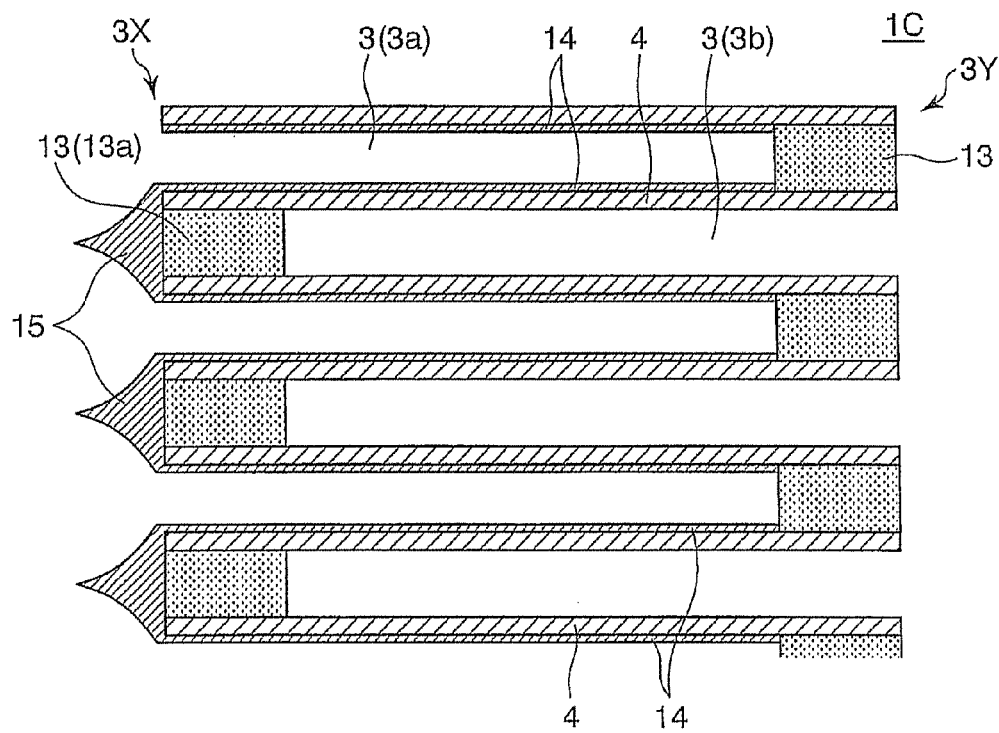
FIG. 8 is a schematic cross-sectional view showing a cross section including the cell extension direction of still another embodiment of a plugged honeycomb structure of the present invention.

There is no particular limitation on the shape of the protruding portions as long as it is a tapered shape protruding from the inflow side end faces of the plugging portions toward the outside in the cell extension direction with the inflow side end faces of the plugging portions as bottom faces. That is, the plugged honeycomb structures shown in FIGS. 1 to 4 show an example of the case where protrusions having an almost quadrangular pyramidal shape with the inflow side end face of the plugging portions as the bottom face are formed. However, for example, as shown in FIG. 7, the shape may be a quadrangular frustum shape where a tip portion of a quadrangular pyramidal shape is cut off (plugged honeycomb structure 1B), or, for example, the shape may be a shape where each of the sides extending to the top from the bottom face of the pyramidal or frustum shape is incurved. For example, the plugged honeycomb structure 1C shown in FIG. 8 shows an example of the case where the faces of the quadrangular pyramidal shape are incurved toward inside. Here, FIGS. 7 and 8 are schematic cross-sectional views each showing a cross-section including the cell extension direction of another embodiment of a plugged honeycomb structure of the present invention. Incidentally, in the plugged honeycomb structures 1B and 1C showing in FIGS. 7 and 8, for the same constituents as those for the plugged honeycomb structure 1A shown in FIG. 3, the same reference numerals are imparted, and the explanations are omitted.

Incidentally, in FIGS. 3, 7, and 8 described above, since the cell shape is a quadrangle, the cases of a quadrangular pyramidal shape or the like with the inflow side end face of the plugging portion as the bottom face are shown. However, when the cell shape is different, the protruding portions should have a pyramidal or frustum shape suitable for the cell shape of the outflow cells. In other words, the protruding portions employ plugging portions plugging the outflow cells as the bottom faces.

[2] Method for manufacturing a plugged honeycomb structure:

Next, an embodiment of a method for manufacturing a plugged honeycomb structure of the present invention will specifically be described. The method for manufacturing a plugged honeycomb structure of the present embodiment is a method for manufacturing the plugged honeycomb structure of the present invention described above. Here, FIG. 10 is an explanatory view schematically showing the step of forming a deposition layer where ceramic particles deposit in an embodiment of a plugged honeycomb structure of the present invention.

Figure 10:
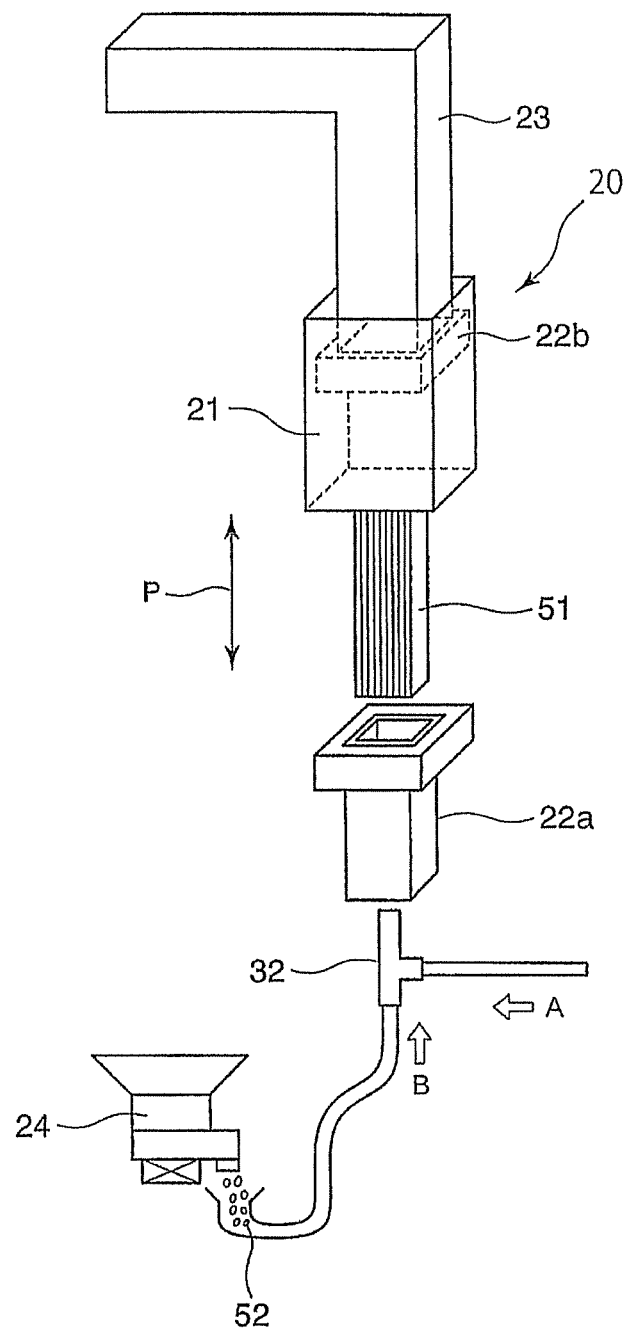
FIG. 10 is an explanatory view schematically showing the step of forming a deposition layer where ceramic particles deposit in an embodiment of a plugged honeycomb structure of the present invention.
Figure 11:
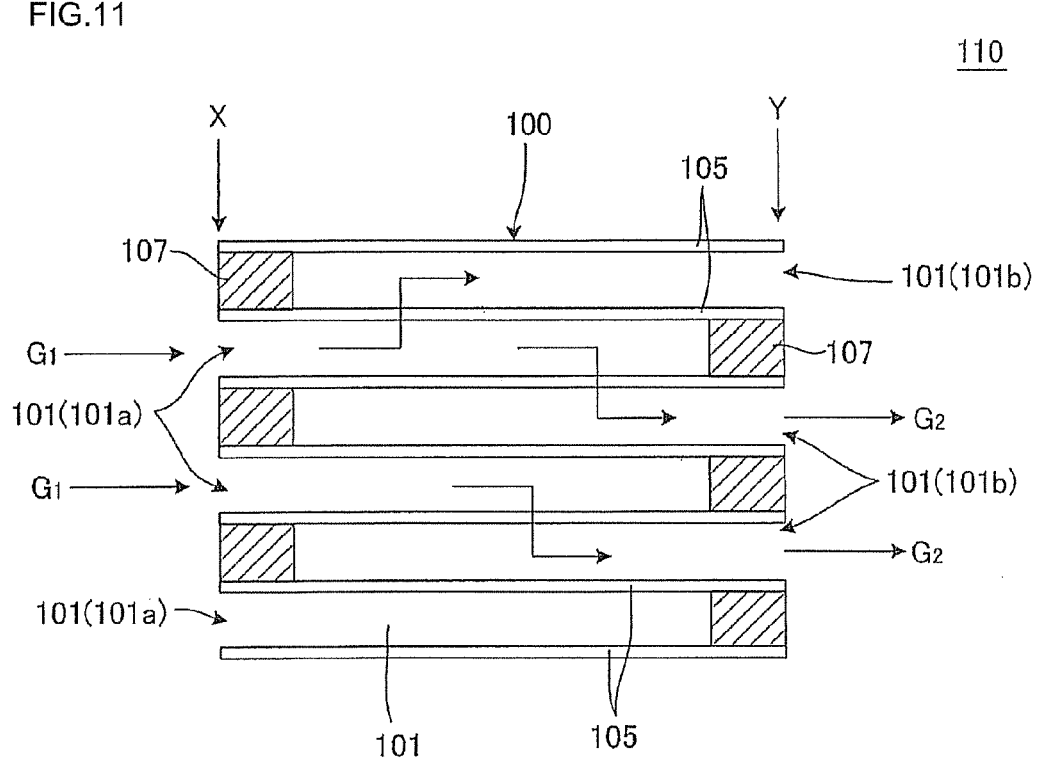
FIG. 11 is a cross-sectional view schematically showing the constitution of a conventional honeycomb filter.

The method for manufacturing a plugged honeycomb structure of the present embodiment is provided with a step of forming plugging portions by alternately plugging the opening end portions of the cell on the one side end face and the other side end face of a honeycomb substrate having porous partition walls having a large number of pores and forming a plurality of cells functioning as gas passages, and, as shown in FIG. 10, a step of forming a deposition layer where the ceramic particles are deposited by sending ceramic particles 52 by means of a gas current from the one side end face side of the honeycomb substrate 51 where the plugging portions are formed to allow the ceramic particles 52 to enter the honeycomb substrate 51 from the opening portions of the cells where no plugging portion is disposed and to allow the ceramic particles to adhere to the surfaces of the partition walls constituting the honeycomb substrate 51.

In addition, as to the method for manufacturing a plugged honeycomb structure of the present embodiment, in a step of forming a deposition layer where the ceramic particles are deposited, the ceramic particles are continuously deposited from the deposition layer to a surface of the plugged portion on one side end faces of the ceramic substrate. And by depositing the ceramic particles on surface of the plugged portion, protruding portions having a protrusion height corresponding with 0.1 to 2 times the length L of the one side of the cell and extending from the end faces of the plugging portions toward the outside of the cell extension direction are formed.

Such constitution enables to manufacture the plugged honeycomb structure 1A as shown in FIGS. 1 to 4 easily. That is, the method for manufacturing a plugged honeycomb structure of the present embodiment forms the protruding portions by the ceramic particles when the PM-trapping layers are formed by sending ceramic particles by means of a gas current from the one side end face side of the honeycomb substrate and can very easily form protruding portions continuous from the PM-trapping layers. In addition, since the ceramic particles are sent by means of the gas flow, the shape of the protruding portions may be formed to have a shape hardly hindering the gas flow, i.e., a shape hardly having pressure drop when gas hits the protruding portions. In addition, the uniformity of the shape of the protruding portions to be formed can be planned.

Incidentally, the honeycomb substrate used for the method for manufacturing a plugged honeycomb structure of the present embodiment can be manufactured according to the manufacturing method described in the aforementioned embodiment of a plugged honeycomb structure.

In addition, the step for forming plugging portions in such a honeycomb substrate can be performed according to a method for manufacturing plugging portions in a known plugged honeycomb structure. For example, there may be employed a method where a mask is disposed on the opening portions on one side of the predetermined cells to fill plugging slurry into the opening portions of the remaining cells.

In addition, the step for forming the deposition layers to function as the PM-trapping layers later and the protruding portions continuous from the deposition layers can be performed by a treatment apparatus 20 provided with, for example, an outer periphery cover 21, the first chuck 22a constituted so as to cover the honeycomb substrate 51 from one end face thereof to the other end face, the second chuck 22b linked by the first chuck 22a on the other side end face side of the honeycomb substrate 51 and holding the honeycomb substrate 51 in the first chuck 22a in an air-tight state, and a discharge flow passage 23 disposed on the back side of the second chuck 22b. Incidentally, the aforementioned discharge flow passage 23 is connected to a blower (not illustrated).

In addition, FIG. 10 shows a state before the honeycomb substrate 51 is held by the first chuck 22a and the second chuck 22b. That is, the honeycomb substrate 51 and the first chuck 22a are pressed in the direction of the arrow P in FIG. 10 to hold the honeycomb substrate 51 by the first chuck 22a and the second chuck 22b, and the formation of deposition layers is actually performed in a state where the first chuck 22a, the honeycomb substrate 51, and the second chuck 22b are housed in the outer periphery cover 21.

In addition, it is preferable that, for example, a differential pressure gauge and a flowmeter are disposed in the discharge flow passage 23 to have a constitution where the flow rate and the pressure of the gas can be confirmed when the air A flows in the honeycomb substrate 51 held by the first chuck 22a and the second chuck 22b.

The honeycomb substrate 51 is held by the first chuck 22a and the second chuck 22b in such a state and disposed inside the outer periphery cover 21. In this state, the blower is driven, and the ceramic particles B supplied from the ceramic particle supply apparatus 24 and the air A are mixed by the use of the particle injector 32, and the ceramic particles B and air A are sent from the one side end face side of the honeycomb substrate 51 disposed in the first chuck 22a and the second chuck 22b. Thus, the ceramic particles B are transported by means of the air flow (air A) and can flow in the substrate 51 from the opening portions of the cells where no plugging portion is disposed.

Incidentally, when a particle injector 32 is used as described above, since the framework particles (ceramic particles) forming the PM-trapping layers are injected at high concentrations in the vicinity of the inlet end face of the substrate, the protrusions (protruding portions) and the PM-trapping layers can efficiently be formed. Incidentally, in the case that such a particle injector is not used, since the framework particles are supplied only by soaring of the framework due to air introduction, the concentration of the framework particles on the suction side (i.e., the first chuck 22a side) becomes low, and almost all the framework particles on the suction side are sucked. Therefore, it becomes very difficult to form the protrusions (protruding portions).

The air A allowed to flow in the substrate passes through the partition walls from the cells with no plugging portion, flows into the adjacent cells, passes through the discharge flow passage 23 from opening port ions on the other side of the adjacent cells, and discharged outside. At this time, the ceramic microparticles B adhere to the surfaces of the partition walls separating and forming the cells having no plugging portion disposed therein to form disposition layers.

At this time, the ceramic microparticles B are deposited up to the surfaces (end faces) of the plugging portions on the one side end face of the honeycomb substrate so as to continue from the deposition layer to form protruding portions having a protrusion height corresponding with 0.1 to 2 times the length L of a side of the outflow cells from the end faces of the plugging portions toward the outside of the cell extension direction.

Incidentally, such ceramic microparticle membrane formation using an air flow is described also in, for example, JP-A-10-249124. However, the ceramic microparticles deposited on the end faces of the plugging portions are removed after the deposition layers are formed as unnecessary substances, and air flow conditions are set lest a large amount of ceramic microparticles should deposit on the end faces of the plugging portions in the document. In contrast, in the method for manufacturing a plugged honeycomb structure of the present embodiment, ceramic microparticles are positively deposited on the end faces of the plugging portions to form protruding portions having a predetermined protrusion height by the ceramic microparticles.

In the method for manufacturing a plugged honeycomb structure of the present embodiment, since the protruding portions are formed by the gas phase conveyance of the actual gas flow (air A), it is very easy to form an optimum shape where pressure drop hardly rises due to the protruding portions upon the actual use of the plugged honeycomb structure disposed in the exhaust gas flow passage as a filter.

Incidentally, the shape of the protruding portions can be made more suitable by adjusting the flow speed, flow rate, and the like of the air flow (air A) to have conditions resembling the flow speed, flow rate, and the like of exhaust gas upon actually using the structure as the filter. For example, the flow speed of the air flow is preferably 50 to 800 L/min., more preferably 100 to 600 L/min., particularly preferably 400 to 500 L/min.

There is no particular limitation on the ceramic microparticles conveyed by the air flow as long as porous PM-trapping layers having pores having an average pore size smaller than that of the partition walls of the honeycomb substrate can be formed, and one of, for example, cordierite, silicon carbide, alumina, mullite, aluminum titanate, and silicon nitride is preferable.

In addition, as the ceramic particles, it is preferable to use particles having an average particle diameter of 0.5 to 15 μm, more preferably 1 to 10 μm, particularly preferably 2 to 5 μm. When the average particle diameter is below 0.5 μm, the framework particles (ceramic particles) enter the substrate to sometimes deteriorate pressure drop properties. On the other hand, when it is above 15 μm, the pore size of the PM-trapping layers becomes large to sometimes deteriorate trapping efficiency or pressure drop properties.

After the PM-trapping layers and the protrusions are thus formed at the same time, a thermal treatment is performed to impart strength, and the deposition layers to function as the PM-trapping layers and the protruding portions continuous from the deposition layers can be formed.

In addition, since the firing conditions (temperature and time) for firing the deposition layers and the protruding portions depends on the kind of the ceramic particles used, suitable conditions may be selected according to the kind. For example, though the firing temperature in the case of firing in, for example, an Ar inert atmosphere is generally about 1400 to 1500° C., the temperature is not limited to the range.

EXAMPLE

Hereinbelow, the present invention will be described specifically with Examples. However, the present invention is by no means limited to these Examples. Various evaluations and measurements in the Examples were performed by the following methods.

[1] Pressure Loss with Soot (kPa):

A plugged honeycomb structure was mounted directly below a turbo charger of a common-rail 2.0 L diesel engine, and the engine was driven with a constant engine rotation frequency of 2000 rpm and a torque of 50 Nm. Pressure loss was measured in the state that soot of 4 g/L as particulate matter was deposited. Incidentally, the aforementioned soot deposition amount shows the soot deposition amount (g) per 1 L of the plugged honeycomb structure.

[2] Evaluation of Inlet Opening Ratio:

A plugged honeycomb structure is mounted on the engine as in the evaluation of pressure drop with soot, and the engine was driven with a constant engine rotation frequency of 2000 rpm and a torque of 50 Nm. In the state that soot of 8 g/L as particulate matter was deposited, an image of the state of openings of the inflow cells was taken. When the opening ratio calculated by binarization of the image obtained above was 90% or more, "good" was given. When it was 80% or more, "fair" was given, and, when it was below 80%, "bad" was given.

[3] Trapping Efficiency:

The exhaust gas discharged by a light oil burner was allowed to flow into a plugged honeycomb structure to measure the particle number (upstream PM particle number) of particulate matter in the exhaust gas before flowing into the plugging honeycomb structure and the particle number (downstream M particle number) of particulate matter in the exhaust gas discharged from the plugged honeycomb structure, and the trapping efficiency (%) of the plugged honeycomb structure was calculated by the following formula (1). In the case that the trapping efficiency was above 80%, "good" was given.

Incidentally, the exhaust gas contained 1 mg/m³ of particulate matter, the temperature of the exhaust gas was 200° C., and the flow rate was 2.4 Nm³/min. In addition, the measurement of the particle number of the particulate matter was performed by counting the particles in the particulate matter by the use of "SMPS (Scanning Mobility Particle Sizer)" (trade name) produced by TSI Incorporated.

$$\{(\text{Upstream PM particle number}) - (\text{Downstream PM particle number})\}/(\text{Upstream PM particle number}) \times 100 \quad (1)$$

[4] Durability Test:

(Test 1) High Load, High Rotation Engine Test:

A plugged honeycomb structure was mounted directly below a turbo charger of a common-rail 2.0 L diesel engine, and the engine was driven for 15 minutes at the state of the engine output point.

(Test 2) Durability Evaluation:

For durability evaluation, a hot vibration test was performed as a heat/vibration test. There were repeated 1000° C.×20 min. and 500° C.×20 min., and vibrations of 30 G were applied to carry out the test for 100 hours. Incidentally, the gas flow rate was 2 m³.

After performing the durability test, the mass of the plugged honeycomb structure was measured to give evaluations of "fair" for the case that the mass of the plugged honeycomb structure was changed after the durability test, "bad" for the case that detachment of a protrusion could visually be confirmed with the change of the mass, and "good" for the case of no change in the mass. Incidentally, in the case that the mass of the plugged honeycomb structure was changed, breakage of the plugged honeycomb structure, particularly, breakage of the protruding portion(s) was caused. Incidentally, the test 1 and the test 2 of the aforementioned durability test are performed continuously to form one test, and, after an engine load is applied to the plugged honeycomb structure in the test 1, the test 2 is performed by the use of the plugged honeycomb structure, thereby evaluating the structure for durability.

Example 1

In the first place, a honeycomb substrate constituting the plugged honeycomb structure was manufactured. As the honeycomb substrate, there was used a honeycomb segment bonded article obtained by bonding 16 (4×4) honeycomb segments together.

Specifically, as the raw material, there was used a mixed powder obtained by mixing a SiC powder of 80% by mass and a metal Si powder of 20% by mass together. To the mixed powder were added methyl cellulose and hydroxypropoxylmethyl cellulose, a surfactant, and water to prepare kneaded clay having plasticity. After the kneaded clay was subjected to extrusion forming by an extruder and then dried with microwaves and hot air, plugging portions were formed by plugging end faces of the cells to show a checkerwise pattern, and the plugged structure was subjected to calcination for degreasing at 550° C. for three hours in an oxidation atmosphere. Then, firing was performed at 1700° C. for 2 hours in an Ar inert atmosphere to bond SiC crystal particles with Si. Thus, a plurality of honeycomb segments (sintered articles) were manufactured.

In the honeycomb segments obtained above, PM-trapping layers and protruding portions continuous from the PM-trapping layers were formed by the use of an apparatus constituted similarly to the apparatus shown in FIG. 10. Specifically, as the ceramic particles, 1.4 g of SiC particles having an average particle diameter of 2.7 μm were supplied from a supply apparatus and conveyed by means of a gas flow to form deposition layers (future PM-trapping layers) and protruding portions (unfired protruding portions). Incidentally, when the ceramic particles (SiC particles) were conveyed by the gas flow, suction was performed at 400 L/min. by a blower from the outflow side end face. Then, the SiC particles were sintered by a thermal treatment (firing) to form PM-trapping layers and protruding portions continuous from the PM-trapping layer. Incidentally, the protrusion height ("protruding portion length" in Table 1) of the protruding portions was 0.15 mm.

Next, bonding slurry was applied on the peripheral faces of the honeycomb segments (sintered articles), which were then combined together and compression-bonded, followed by drying by heating to obtain a honeycomb segment bonded article having a quadrangular columnar entire shape. The honeycomb segments had a length of 152 mm in the cell extension direction, a partition wall thickness of 305 µm, and a cell density of 46.5 cells/cm². In addition, the partition walls constituting the honeycomb segments had a porosity of 42% and an average pore size of 15 µm. Table 1 shows the partition wall thickness and cell density of the honeycomb substrate.

The shape of the protruding portions formed above was a shape where the faces of a quadrangular pyramidal shape were curved toward the inside of the shape as shown in FIG. 8. Incidentally, when the shape of the protruding portions formed above was a shape where the faces of a quadrangular pyramidal shape were curved toward the inside of the shape as shown in FIG. 8, it was shown as the "shape a" in "shape of protruding portion" in Table 1, and, when the shape of the protruding portions formed above was a shape where the tip portion of a quadrangular pyramidal shape was cut off as shown in FIG. 7, it was shown as the "shape b".

Incidentally, when the ceramic particles are conveyed together with the gas flow, the ceramic particles and the gas flow (air) were mixed together by the use of a particle injector as shown in FIG. 10. When the PM-trapping layers were formed by the use of such a particle injector, "a particle injector" is shown in the "PM-trapping layer formation method" of Table 1. When the PM-trapping layers were formed without using the particle injector, "no particle injector" is shown in Table 1.

The plugged honeycomb structure obtained in such a manner was evaluated and measured for the aforementioned pressure drop with soot (kPa), evaluation of inlet opening ratio, trapping efficiency, and durability test. The results of the measurement are shown in Table 1.

TABLE 1

| | Partition wall thickness (µm) | Cell density (cell/cm²) | Length of a side of plugged cell (mm) | Presence of PM-trapping layer | Thickness of PM-trapping layer (µm) | Shape of protruding portion | Protruding portion length (mm) |
|---|---|---|---|---|---|---|---|
| Example 1 | 305 | 46.5 | 1.5 | Present | 13 | a | 0.15 |
| Example 2 | 305 | 46.5 | 1.5 | Present | 30 | a | 0.5 |
| Example 3 | 305 | 46.5 | 1.5 | Present | 45 | a | 1.2 |
| Example 4 | 305 | 46.5 | 1.5 | Present | 62 | a | 2.7 |
| Example 5 | 305 | 46.5 | 1.5 | Present | 26 | b | 0.17 |
| Example 6 | 305 | 46.5 | 1.5 | Present | 74 | b | 3 |
| Example 7 | 305 | 46.5 | 1.5 | Present | 15 | b | 0.16 |
| Example 8 | 305 | 46.5 | 1.5 | Present | 64 | b | 2.9 |
| Example 9 | 305 | 46.5 | 1.5 | Present | 7 | a | 0.15 |
| Example 10 | 305 | 46.5 | 1.5 | Present | 61 | a | 3 |
| Example 11 | 381 | 24.8 | 2 | Present | 11 | a | 0.2 |
| Example 12 | 381 | 24.8 | 2 | Present | 81 | a | 4 |
| Example 13 | 305 | 46.5 | 1.5 | Present | 5 | a | 0.05 |
| Example 14 | 305 | 46.5 | 1.5 | Present | 101 | a | 4.1 |
| Example 15 | 381 | 24.8 | 2 | Present | 9 | a | 0.15 |
| Example 16 | 381 | 24.8 | 2 | Present | 86 | a | 5 |
| Example 17 | 305 | 46.5 | 1.5 | Present | 5 | b | 0.08 |
| Example 18 | 305 | 46.5 | 1.5 | Present | 87 | b | 4.2 |
| Comp. Ex. 1 | 305 | 46.5 | 1.5 | None | 0 | No protrusion | — |
| Comp. Ex. 2 | 381 | 24.8 | 2 | None | 0 | No protrusion | — |
| Comp. Ex. 3 | 305 | 46.5 | 1.5 | Present | 31 | No protrusion | — |
| Comp. Ex. 4 | 305 | 46.5 | 1.5 | Present | 32 | No protrusion | — |
| Comp. Ex. 5 | 381 | 24.8 | 2 | Present | 80 | No protrusion | — |
| Comp. Ex. 6 | 305 | 46.5 | 1.5 | Present | 29 | No protrusion | — |

| | PM-trapping layer forming method | Suction flow rate (L/min) | Pressure drop with soot (kPa) | Evaluation of Inlet opening ratio | Trapping efficiency | Durability test |
|---|---|---|---|---|---|---|
| Example 1 | A particle injector | 400 | 7.1 | Good | Good | Good |
| Example 2 | A particle injector | 400 | 6.9 | Good | Good | Good |
| Example 3 | A particle injector | 400 | 7 | Good | Good | Good |
| Example 4 | A particle injector | 400 | 7.1 | Good | Good | Good |
| Example 5 | A particle injector | 50 | 7.2 | Good | Good | Good |
| Example 6 | A particle injector | 50 | 7.3 | Good | Good | Good |
| Example 7 | A particle injector | 200 | 7.1 | Good | Good | Good |
| Example 8 | A particle injector | 200 | 7.3 | Good | Good | Good |
| Example 9 | A particle injector | 800 | 7 | Good | Good | Good |
| Example 10 | A particle injector | 800 | 7.2 | Good | Good | Good |
| Example 11 | A particle injector | 400 | 9.3 | Good | Good | Good |
| Example 12 | A particle injector | 400 | 9.6 | Good | Good | Good |
| Example 13 | A particle injector | 400 | 8 | Fair | Good | Good |
| Example 14 | A particle injector | 400 | 7.7 | Good | Good | Fair |
| Example 15 | A particle injector | 400 | 10.2 | Fair | Good | Good |
| Example 16 | A particle injector | 400 | 9.8 | Good | Good | Fair |
| Example 17 | A particle injector | 50 | 8.1 | Fair | Good | Good |
| Example 18 | A particle injector | 50 | 7.9 | Good | Good | Fair |
| Comp. Ex. 1 | — | — | 12.2 | Bad | Bad | — |
| Comp. Ex. 2 | — | — | 13.8 | Bad | Bad | — |
| Comp. Ex. 3 | A particle injector | 400 | 7.8 | Bad | Good | — |

TABLE 1-continued

| Comp. Ex. 4 | A particle injector | 50 | 8 | Bad | Good | — |
| Comp. Ex. 5 | A particle injector | 400 | 10.8 | Bad | Good | — |
| Comp. Ex. 6 | No particle injector | 250 | 8.1 | Bad | Good | — |

Example 2 to 18

There were manufactured plugged honeycomb structures constituted in the same manner as in Example 1 except that the partition wall thickness, cell density, shape of the protruding portions, and length of the protruding portions (protrusion height of the protruding portions) were changed as shown in Table 1. The plugged honeycomb structures were evaluated and measured for the aforementioned pressure drop with soot (kPa), inlet opening ratio, trapping efficiency, and durability test. The measurement results are shown in Table 1.

Comparative Examples 1 and 2

There were manufactured plugged honeycomb structures constituted in the same manner as in Example 1 except that the partition wall thickness, cell density, shape of the protruding portions, and length of the protruding portions (protrusion height of the protruding portions) were changed as shown in Table 1 and that neither the PM-trapping layers nor the protruding portions continuous from the PM-trapping layers are formed. The plugged honeycomb structures were evaluated and measured for the aforementioned pressure drop with soot (kPa), inlet opening ratio, trapping efficiency, and durability test. The measurement results are shown in Table 1.

Comparative Examples 3 to 6

There were manufactured plugged honeycomb structures constituted in the same manner as in Example 1 except that the partition wall thickness, cell density, shape of the protruding portions, and length of the protruding portions (protrusion height of the protruding portions) were changed as shown in Table 1 and that no protruding portion continuous from the PM-trapping layer is formed. The plugged honeycomb structures were evaluated and measured for the aforementioned pressure drop with soot (kPa), inlet opening ratio, trapping efficiency, and durability test. The measurement results are shown in Table 1.

(Discussion)

As the results of the Examples, it is understood that the plugged honeycomb structures having protruding portions (protrusions) formed therein had smaller pressure drop than the plugged honeycomb structure without protruding portions. In the case of no protruding portion, exhaust gas hits the end faces of the plugging portions to cause disorder of the gas flow in the vicinity of the opening portions on the inflow side. This hinders soot's entering the inside of the cells, and the soot stays in the inflow side opening portions. As a result, the diameter of the inlet openings of the cells becomes small, and pressure drop properties are deteriorated. On the other hand, in the case that the protruding portions are formed, the gas flow is adjusted by the protrusions, soot is inhibited from depositing in the inflow side opening portions. Therefore, the pressure drop properties are not deteriorated. In addition, when the height of protrusions exceeds twice the length of a side of the plugging portions (i.e., outflow cell), partial detachment of the protrusions was seen. This seems that the protruding portions formed became unstable because of the long protrusions to cause partial detachment. Therefore, the height of the protruding portions is necessarily below twice with respect to the length L of a side of the outflow cell.

A plugged honeycomb structure of the present invention can suitably be used as a filter for trapping particulate matter contained in exhaust gas discharged from internal combustion engines such as a diesel engine, an engine for ordinary vehicles, and an engine for large-size automobiles such as a truck and a bus and various combustion apparatuses.

In addition, a method for manufacturing a plugged honeycomb structure of the present invention can easily manufacture the aforementioned plugged honeycomb structure and, in particular, can form protrusions continuous from the PM-trapping layers into a suitable (optimum) shape having less pressure drop.

What is claimed is:

1. A plugged honeycomb structure comprising:
   a columnar honeycomb substrate having porous partition walls separating and forming a plurality of cells extending from one side end face to another side end face and functioning as gas passages,
   plugging portions for alternately plugging opening end portions on a gas inflow side and opening end portions on a gas outflow side of the cells, and
   porous particulate matter (PM) trapping layers being disposed to have a membrane shape on surfaces of the partition walls that define inflow cells whose opening end portions are open on the gas inflow side, and having pores with an average pore size smaller than that of the partition walls;
   wherein the PM-trapping layers extend up to inflow side end faces of outflow cells whose opening end portions are with plugging portions on the gas inflow side, and adjacent PM-trapping layers with the partition walls and the plugging portion therebetween are disposed so as to continue onto the inflow side end faces of the plugging portions in the outflow cells to form protruding portions having a protrusion height corresponding to 0.1 to 2 times the length of the plugging portions in the outflow cells.

2. The plugged honeycomb structure according to claim 1, wherein the protruding portions formed continuously from the PM-trapping layers have a protrusion height of 0.05 to 5 mm.

3. The plugged honeycomb structure according to claim 1, wherein the protruding portions continuously formed from the PM-trapping layers have a pyramidal shape, a frustum shape, or a shape where each of the sides extending to the top from the bottom face of the pyramidal or frustum shape with the inflow side end faces of the plugging portions as the bottom faces is incurved.

4. The plugged honeycomb structure according to claim 2, wherein the protruding portions continuously formed from the PM-trapping layers have a pyramidal shape, a frustum shape, or a shape where each of the sides extending to the top from the bottom face of the pyramidal or frustum shape with the inflow side end faces of the plugging portions as the bottom faces is incurved.

5. The plugged honeycomb structure according to claim 1, wherein the PM-trapping layers have a thickness of 1 to 100 μm.

6. The plugged honeycomb structure according to claim 2, wherein the PM-trapping layers have a thickness of 1 to 100 μm.

7. The plugged honeycomb structure according to claim 3, wherein the PM-trapping layers have a thickness of 1 to 100 μm.

8. The plugged honeycomb structure according to claim 4, wherein the PM-trapping layers have a thickness of 1 to 100 μm.

9. A method for manufacturing a plugged honeycomb structure comprising:
   a step of forming plugging portions by alternately plugging opening end portions of cells on one side end face and another side end face of a honeycomb substrate having porous partition walls with a large number of pores and forming a plurality of cells functioning as gas passages, and
   a step of forming deposition layers in the gas passages where ceramic particles are deposited by sending the ceramic particles by means of a gas current from the one side end face side of the honeycomb substrate towards inflow cells whose opening end portions are open so that the ceramic particles enter the honeycomb substrate from the opening portions of the cells where no plugging portion is disposed and allowing the ceramic particles to adhere to the surfaces of the partition walls constituting the honeycomb substrate;
   wherein, in the step of forming the deposition layers, where the ceramic particles are deposited, the ceramic particles are also deposited onto the one side end face surfaces of the plugging portions that define outflow cells of the honeycomb substrate so that the deposition layers continue to form protruding portions having a protrusion height corresponding to 0.1 to 2 times the length of the plugging portions in the outflow cells.

10. The method for manufacturing a plugged honeycomb structure according to claim 9, wherein, in the step for forming a deposition layer where the ceramic particles are deposited, suction is performed from the opening portion of the cells having no plugging portion disposed therein on the other side end face side of the honeycomb substrate where the plugging portions are formed to allow the ceramic particles flowing into the substrate from the one side end face side to adhere to the surfaces of the partition walls.

11. The method for manufacturing a plugged honeycomb structure according to claim 9, where particles having an average particle diameter of 0.5 to 15 μm are used as the ceramic particles.

12. The method for manufacturing a plugged honeycomb structure according to claim 10, where particles having an average particle diameter of 0.5 to 15 μm are used as the ceramic particles.

13. The method for manufacturing a plugged honeycomb structure according to claim 9, wherein the flow rate of the gas for sending the ceramic particles in the step for forming a deposition layer where the ceramic particles are deposited is 50 to 800 L/min.

14. The method for manufacturing a plugged honeycomb structure according to claim 10, wherein the flow rate of the gas for sending the ceramic particles in the step for forming a deposition layer where the ceramic particles are deposited is 50 to 800 L/min.

15. The method for manufacturing a plugged honeycomb structure according to claim 11, wherein the flow rate of the gas for sending the ceramic particles in the step for forming a deposition layer where the ceramic particles are deposited is 50 to 800 L/min.

16. The method for manufacturing a plugged honeycomb structure according to claim 12, wherein the flow rate of the gas for sending the ceramic particles in the step for forming a deposition layer where the ceramic particles are deposited is 50 to 800 L/min.

* * * * *

UNITED STATES PATENT AND TRADEMARK OFFICE
CERTIFICATE OF CORRECTION

PATENT NO.        : 8,496,724 B2
APPLICATION NO.   : 13/070610
DATED             : July 30, 2013
INVENTOR(S)       : Shingo Tokuda et al.

Page 1 of 1

It is certified that error appears in the above-identified patent and that said Letters Patent is hereby corrected as shown below:

In the Claims

Column 24, line 39: Please add "plugged" after -- are --

Signed and Sealed this
Fifteenth Day of October, 2013

Teresa Stanek Rea
*Deputy Director of the United States Patent and Trademark Office*